US008739298B2

(12) United States Patent
Biswas et al.

(10) Patent No.: US 8,739,298 B2
(45) Date of Patent: May 27, 2014

(54) METHOD AND SYSTEM FOR ENFORCING A LICENSE DEPENDENCY RULE FOR A SOFTWARE APPLICATION

(75) Inventors: Sanjeev Kumar Biswas, Ghaziabad (IN); Akash Jain, Uttar Pradesh (IN); Kanika Dalmia Gupta, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 820 days.

(21) Appl. No.: 12/622,083

(22) Filed: Nov. 19, 2009

(65) Prior Publication Data

US 2014/0033315 A1    Jan. 30, 2014

(51) Int. Cl.
G06F 21/00        (2013.01)
(52) U.S. Cl.
USPC ............................................... 726/27; 726/1
(58) Field of Classification Search
USPC .................................. 726/26, 27, 1
See application file for complete search history.

(56) References Cited

U.S. PATENT DOCUMENTS

| | | | | |
|---|---|---|---|---|
| 5,671,412 | A * | 9/1997 | Christiano .............................. 1/1 |
| 5,790,664 | A * | 8/1998 | Coley et al. .................... 709/203 |
| 6,920,567 | B1 * | 7/2005 | Doherty et al. ................. 726/22 |
| 7,120,429 | B2 * | 10/2006 | Minear et al. .................. 455/419 |
| 8,103,592 | B2 * | 1/2012 | Lilikov et al. .................... 705/59 |
| 8,605,317 | B2 * | 12/2013 | Yuki ............................. 358/1.15 |
| 2002/0188608 | A1 * | 12/2002 | Nelson et al. ................... 707/10 |
| 2005/0144175 | A1 * | 6/2005 | Gikas et al. ..................... 707/10 |
| 2006/0064387 | A1 * | 3/2006 | Jose et al. ........................ 705/59 |
| 2006/0069653 | A1 * | 3/2006 | Lelikov et al. .................. 705/59 |
| 2006/0116966 | A1 * | 6/2006 | Pedersen et al. ................ 705/59 |
| 2007/0016532 | A1 * | 1/2007 | Zhang et al. .................... 705/59 |
| 2007/0143222 | A1 * | 6/2007 | Chicks et al. ................... 705/59 |
| 2007/0174606 | A1 * | 7/2007 | Nakano et al. ................ 713/153 |
| 2008/0027871 | A1 * | 1/2008 | Seo ................................. 705/59 |
| 2008/0064493 | A1 * | 3/2008 | Andersson ...................... 463/29 |
| 2008/0201705 | A1 * | 8/2008 | Wookey ........................ 717/175 |
| 2008/0208754 | A1 * | 8/2008 | Zunke et al. ................... 705/59 |
| 2009/0037835 | A1 * | 2/2009 | Goldman ...................... 715/771 |
| 2009/0055320 | A1 * | 2/2009 | Goertler et al. ................ 705/59 |
| 2009/0089864 | A1 * | 4/2009 | Tyrrell et al. ..................... 726/6 |
| 2009/0187995 | A1 * | 7/2009 | Lopatic ........................... 726/31 |
| 2009/0241107 | A1 * | 9/2009 | Kobayashi .................... 717/178 |
| 2009/0245236 | A1 * | 10/2009 | Scott et al. .................... 370/352 |
| 2009/0328225 | A1 * | 12/2009 | Chambers et al. ............. 726/26 |
| 2010/0071069 | A1 * | 3/2010 | Sugiura et al. ................. 726/26 |
| 2010/0192147 | A1 * | 7/2010 | Kadota ......................... 717/178 |
| 2011/0030062 | A1 * | 2/2011 | Hsu et al. ....................... 726/26 |
| 2011/0276501 | A1 * | 11/2011 | Sako et al. .................... 705/310 |
| 2011/0286044 | A1 * | 11/2011 | Yuki ............................ 358/1.15 |
| 2012/0096566 | A1 * | 4/2012 | Lilikov et al. .................. 726/27 |

* cited by examiner

*Primary Examiner* — David García Cervetti (74) *Attorney, Agent, or Firm* — Schwegman Lundberg & Woessner, P.A.

(57) ABSTRACT

Methods and systems for enabling a software application that does not have independent licensing information are described. Consistent with some embodiments, a first software application is associated with a license dependency rule that indicates one or more other software applications that must be installed and activated in order for the first software application to be fully executed and used on the target computer system. A license manager module evaluates the license dependency rule, for example, by making remote license calls to verify the license status of the software applications identified in the license dependency rule.

20 Claims, 8 Drawing Sheets

METHOD AND SYSTEM FOR ENFORCING A LICENSE DEPENDENCY RULE FOR A SOFTWARE APPLICATION

TECHNICAL FIELD

The present disclosure generally relates to End User Licensing Agreements (EULA's) and software activation and enabling techniques. More specifically, the present disclosure relates to computer-based methods and systems for enabling a software application for use by an end-user based on evaluating a license dependency rule that requires one or more other software applications to be installed and activated.

BACKGROUND

To protect against unauthorized copying and use of software applications, many software vendors utilize some form of product activation procedure. In general, product activation (sometimes referred to as software activation) involves a procedure for verifying the authenticity of a software product, and ensuring that the software product is used within the scope of its end-user license agreement (EULA). In a typical product activation procedure, a software application performs a hash operation to generate a hash of an identifier (ID) specific to a product's license (e.g., a product key) and a hardware serial number, identifying the particular computer or device on which the software application is to be utilized. The resulting hash, which is commonly referred to as an installation ID or a product activation ID, is then sent to a software vendor's license manager to verify the authenticity of the product key, and in some instances, to ensure that the product key is not being used simultaneously for multiple installations on multiple computers or devices. Of course, a variety of alternative product activation procedures exist. As described below, one problem with conventional license managers and product activation procedures is that they are designed to operate only with certain primary software applications, and generally do not support auxiliary software applications or components, such as add-on components or other supporting software applications.

In some instances, one or more software applications may be distributed to end-users in a suite of applications. Some of the applications in the suite may be designated as primary applications or point products, and distributed along with one or more other applications that are designated as auxiliary software applications and/or components. These auxiliary software applications and/or components may be designed to operate with, and generally enhance the functionality of one or more of the primary software applications in the suite of applications. The auxiliary software applications may be stand-alone applications that provide some specialized functionality, or in some cases, the auxiliary software applications may be dependent add-on software components that can only be invoked from another software application. For instance, many software applications are designed with a view to allowing additional functionality to be realized via one or more add-on software components. Web browser applications frequently utilize add-on components to enable the presentation or play back of various audio and video formats. Many video game applications utilize add-on components to provide additional content, such as advanced or customized levels of play, and/or special characters or background scenes. Certain graphics editing programs, such as Adobe Photoshop® from Adobe Systems Incorporated of San Jose, Calif., utilize add-on components to provide support for different graphics file formats, and to provide certain graphic and image processing functions. In any case, whether the auxiliary software components are stand-alone applications, or dependent add-on components, providing each auxiliary component an independent and separate serial number or product key, and requiring that each auxiliary component be subject to the same activation procedure as each primary software product adds to the overall complexity of the licensing and software activation process, thereby adding to the potential cost of delivering the software applications to the end-user.

Figure 1:
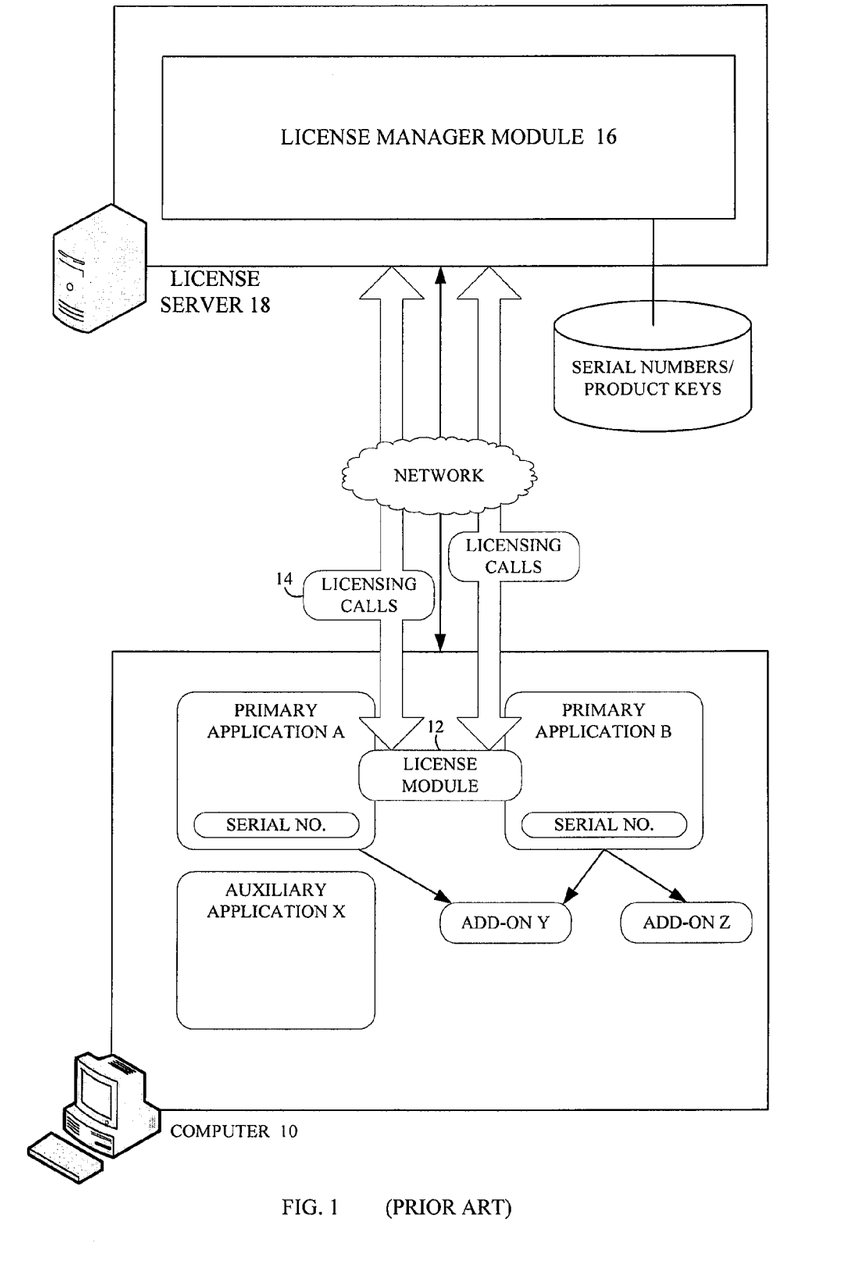
FIG. 1 illustrates a functional block diagram of the modules involved in a conventional product licensing and activation scheme in which auxiliary software components are not subject to independent End-User Licensing Agreements and/or product activation mechanisms.

For example, in FIG. 1, a functional block diagram of the software modules involved in a conventional licensing and product activation scheme, used to enforce the EULA of a primary software application, is shown. In the example presented in FIG. 1, two primary software applications (e.g., Application A and Application B) are installed on the computer system 10. In addition, one auxiliary application (e.g., Application X) and two add-on components (e.g., add-on Y and add-on Z) are shown to be installed on the computer system 10. The applications and add-on components may have been installed together as part of a suite of applications, or independently. In any case, with conventional licensing and software activation mechanisms, only those applications that have been designated as primary software applications are assigned licensing information, such as a serial number or product key, and made subject to an activation process. In this example, a shared license module 12 is shown communicating licensing calls 14 with license information for the primary applications (e.g., Applications A and B) to the license manager module 16 residing and executing on the remote license server 18. Consequently, because auxiliary Application X and add-on components Y and Z are not individually licensed, and therefore not assigned licensing information, such as a serial number or product key, a software vendor or developer has little control over how and when the auxiliary software applications and components are utilized.

DESCRIPTION OF THE DRAWINGS

Some embodiments are illustrated by way of example and not limitation in the figures of the accompanying drawings, in which.

DETAILED DESCRIPTION

Methods and systems for enabling a software application by evaluating a license dependency rule are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

As used herein, a "primary software application" is a software application or component having independent licensing information (e.g., serial number or product code) for use with a software activation scheme, under which the licensing information is to be verified by a remote license server. In the context of the present disclosure, an "auxiliary software application" is a software application or component that does not have its own license information, and is therefore not subject to the same license verification operation as a primary software application. As described in greater detail herein, an auxiliary software application is associated with a license dependency rule which makes the operation and use of the auxiliary software application subject to having one or more primary software applications properly installed and activated, for example, via a license verification operation, or license call, directed to a remote license server. Although not necessarily the case, typically a software application designated as a primary software application will be a stand-alone application that can be executed independent of any other applications. An auxiliary software application may be a stand-alone application, or alternatively, a dependent add-on application or component, such as a plug-in, snap-in, or add-in that cannot execute independently, but instead is invoked from another application. Consistent with embodiments of the invention, auxiliary software applications are associated with license dependency rules that define the set of primary software applications that are required to be installed, licensed and activated on a target computer system in order for the auxiliary software application or component to be enabled and used on the target computer system.

In some embodiments, a license dependency rule is a technical construct that is part of a software activation paradigm in which auxiliary software applications are not subject to an independent end-user license agreement (EULA), but instead, the enablement, operation and use of an auxiliary software applications is subject to one or more primary software applications being properly installed and activated (e.g., having a verified license, as indicated by a license status). As such, in some embodiments, a license dependency rule is not in fact a license in the legal sense, but a technical construct that prevents the execution and use of an auxiliary software application or component when certain primary software applications are not properly installed and activated. However, in some embodiments, a license dependency rule may be an enforcement technique for an actual license associated with an auxiliary software component. In such a case, each auxiliary software application might be subject to its own EULA that corresponds with a license dependency rule. As such, a license dependency rule may serve as a mechanism that ensures that the execution and use of an auxiliary software application is within the scope of the EULA associated with the auxiliary software application. Such a licensing paradigm may be referred to as a parasitic licensing paradigm, to reflect the fact that a license, or in some cases only the execution and use, of an auxiliary software application or component is dependent upon the license status of one or more primary software applications.

In general, when an auxiliary software application is initially invoked or executed, a local license manager module residing and executing on the same computer as the auxiliary software application will evaluate the installation status and license status of one or more primary software applications in accordance with a license dependency rule associated with the auxiliary software application. A license dependency rule may specify that one or more particular primary software applications are required, meaning those primary software applications must be installed and activated (e.g., have a valid license status) before the auxiliary software application can be fully executed and used by the end-user. In some cases, a license dependency rule may specify that one or more primary software applications in set of primary software applications are required. For instance, a license dependency rule may require that any one primary software application in a defined set of primary software applications is required to be installed and activated in order for the auxiliary software application or component to be enabled and used by the end-user. In some instances, the execution and operation of an auxiliary software application or component, such as a plug-in module, may be dependent upon a primary software application, such that the dependent auxiliary software application cannot execute independently, but must be invoked from a primary software application. In such a scenario, the required primary software applications—that is, the primary applications that must be installed and activated according to the license dependency rule for the auxiliary software component—may or may not include the primary software application from which the dependent auxiliary software component has been invoked or executed. By way of example, a license dependency rule for a particular dependent auxiliary software application may require that two primary software applications—primary application A and primary application B—are properly installed and activated before the dependent auxiliary software application can be fully executed and used by an end-user, even when the auxiliary software component is being invoked from a third primary software application, for example, primary application C. Again by way of example, a license dependency rule may require that primary application A and primary application B are both properly installed and activated, in addition to any one of primary applications C, D, or E, prior to an independently executable auxiliary software application being fully executed and used by an end-user. Accordingly, a software developer utilizing the license dependency rules and corresponding rule evaluation scheme has great flexibility in specifying the required and optional primary software applications on which the execution and use of an auxiliary software application ultimately depends. Other aspects of the inventive subject matter will become readily apparent from the description of the figures that follow.

Figure 2:
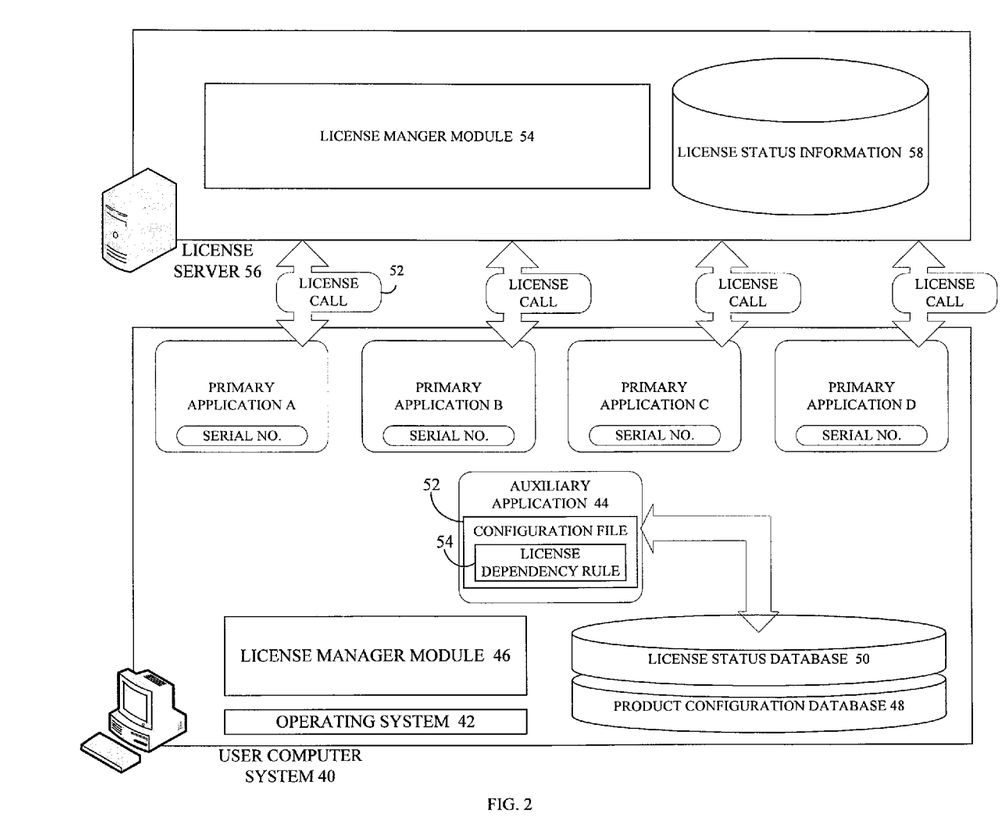
FIG. 2 illustrates a functional block diagram of various software applications installed on a computer system, and the modules involved in evaluating a license dependency rule that is utilized in enabling an auxiliary software application, according to an embodiment of the invention.

FIG. 2 illustrates a functional block diagram of various software applications installed on a computer system 40, and the modules involved in evaluating a license dependency rule that is utilized in enabling an auxiliary software application 44, according to an embodiment of the invention. As illustrated in FIG. 2, a user computer system 40 includes an operating system 42 and several primary software applications that have been installed, including primary applications A, B, C, and D. In addition, an installed auxiliary software application 44 is shown. The computer system 40 also includes a local license manager module 46 for managing the product activation process for primary software applications and for evaluating and enforcing license dependency rules for auxiliary software applications. When evaluating license dependency rules for an auxiliary software application, the local license manager module 46 utilizes a product configuration database 48 and a local license status database 50. For instance, in some embodiments, when an auxiliary software application is first installed, the license dependency rule for that auxiliary software application is written to the product configuration database. Accordingly, the local license manager module 46 reads license dependency rules from the product configuration database. Similarly, the license status of primary software applications, as well as the operational or license status of auxiliary software applications may be written to the local license status database 50. In some embodiments, the databases 48 and 50 may be files, or other data structures stored at the computer system. Furthermore, in some embodiments, the license manager module 46 and the databases 48 and 50 may reside (and execute) on a computer other than the computer on which the software applications are installed.

As illustrated in FIG. 2, the auxiliary software application 44 includes a configuration file 52, which contains a license dependency rule 54 for the auxiliary application 44. In particular, the license dependency rule 54 of the configuration file 52 identifies a set of primary software applications, some of which are required to be installed and activated in order for the auxiliary software application to be fully executed and used by an end-user. As used herein, the term "host driver" refers to the primary software application, or combination of primary software applications, that are required to be installed and activated in order for an auxiliary software application or component to be fully executable and usable by an end-user.

In various embodiments of the invention, the particular format of a license dependency rule as well as the variety of license dependency rule types may vary. However, in some embodiments, there are three specific license dependency rule types. The first license dependency rule type is referred to herein as a "single host driver" rule (also referred to as type "ANY"). A single host driver rule requires that one primary software application selected from a list of primary software applications defined by the license dependency rule is required to be installed and activated on the target computer system (e.g., computer system 40 in FIG. 2), before the auxiliary software application can be fully executed and used by an end-user. A second type of license dependency rule is referred to herein as a "multiple host driver" rule (also referred to as type "ALL"). As used herein, a multiple host driver rule specifies a list of primary software applications, all of which must be installed and activated in order for the auxiliary software application to be fully executed and used by an end-user. Finally, a third rule type referred to herein as a "selective host driver" rule (also referred to as rule type "AT LEAST ONE") requires that at least one primary software application selected from a first list of required primary software applications must be installed and activated, and a second primary software application selected from a list of optional primary software applications must also be installed and activated, in order for the auxiliary software application to be fully executable and used by the end-user. Of course, other license dependency rule types may be used consistent with the scope and spirit of the invention. In particular, some rule types may specify multiple sets of primary software applications, where one or more primary software applications from each set is specified as a required or optional host application.

When an auxiliary software application or component 44 is initially installed on a computer system 40, the auxiliary software application's configuration file 52 is analyzed, and the auxiliary software application's license dependency rule 54 is written to a product configuration database 48. When the auxiliary software application is executed for the first time, or in the case of a plug-in or add-on module, invoked from a primary software application for the first time, the local license manager module 46 is invoked to perform a local license verification operation for the auxiliary software application. In particular, the local license manager module 46 queries a local license status database 50 for the current license or operational status of the auxiliary software application 44. If there is no entry in the license status database 50 for the auxiliary software application 44, as will be the case when the auxiliary software application 44 is being executed or invoked for the very first time, the local license manager module 46 reads the license dependency rule 54 for the auxiliary software application 46 from the product configuration database 48, and then evaluates the license dependency rule 54, for example, by making one or more license calls 52 to a remote license server, to determine whether the license dependency rule 54 is satisfied. When the local license manager module 46 determines that the license dependency rule 54 is satisfied, indicating that one or more primary software applications, as specified in the license dependency rule, are in fact installed at the computer system 40 and have been properly activated, as indicated by license status information 58 obtained from the remote license server 56, the local license manager module 46 updates the license or operational status of the auxiliary software application in the local license database.

In some embodiments, evaluating a license dependency rule for an auxiliary software application involves first reading the license dependency rule for the auxiliary application 44 from the product configuration database 48, where the license dependency rule was stored during the installation of the auxiliary application 44. By reading the license dependency rule, the local license manager 46 determines the particular primary software applications that may be used for purposes of licensing, or otherwise enabling the execution of, the auxiliary software application. For example, depending upon the license dependency rule, some primary applications may be required, and some primary applications may be optional. For each primary application that is required to be installed and activated, the local license manager module 46 may first verify the current installation status of the primary software application, for example, by checking an installation record or other installation information that may be part of a particular database, configuration file, or system registry associated with the operating system. If a required primary software application is determined to be installed, the local license manager module 46 next performs one or more remote license verification calls 52, which are directed to a license manager 54 on a remote license server 56, to verify that a host application has been properly activated, for example, by having had its license information (e.g., serial number of product key) validated. If all of the host applications that are required (e.g., as indicated by the license dependency rule for the auxiliary software application) have a valid license status, as indicated by license status information 58 maintained at the license server 56, then the local license manager module 46 may verify that at least one primary application, of the set of primary applications indicated as being optional, is in fact installed and activated.

Once the local license manager module 46 has determined that the necessary primary applications are installed and activated such that the license dependency rule for the auxiliary application is satisfied, the local license manager module 46 updates the current license or operational status of the auxiliary software application in the local license status database 50. For example, when updating the operational status of the auxiliary application in the local license status database 50, the local license manager module 46 may indicate the specific primary software applications whose licenses have been verified via the remote license verification calls in determining that the license dependency rule is satisfied. For instance, if the license dependency rule indicates that one of a set of host applications is required, the operational status information written to the license status database 50 for the auxiliary application will include which particular primary application of the set of primary applications has actually had its license status verified in the process of evaluating a license dependency rule. Accordingly, if the license status of the particular primary software application on which the enablement of the auxiliary application is dependent changes in the future, the local license manager module 46 may perform a subsequent license call to the license server to determine that at least one of the optional host applications, as specified in the license dependency rule, is in fact activated, thereby satisfying the license dependency rule for the auxiliary application.

Figure 3:
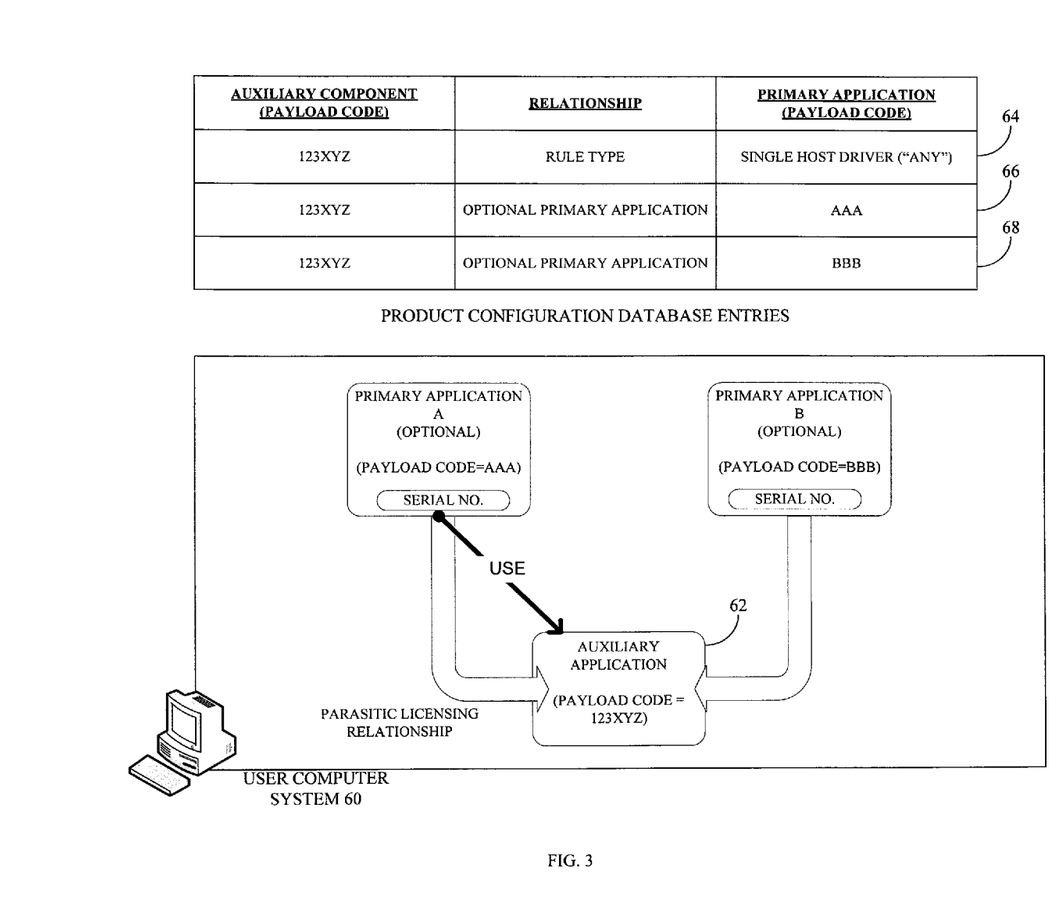
FIGS. 3 through 5 illustrate block diagrams showing various types of relationships between primary software applications and auxiliary software applications, which may form the basis of a license dependency rule that determines whether an end-user is allowed to enable and use an auxiliary software application, according to an embodiment of the invention.
Figure 4:
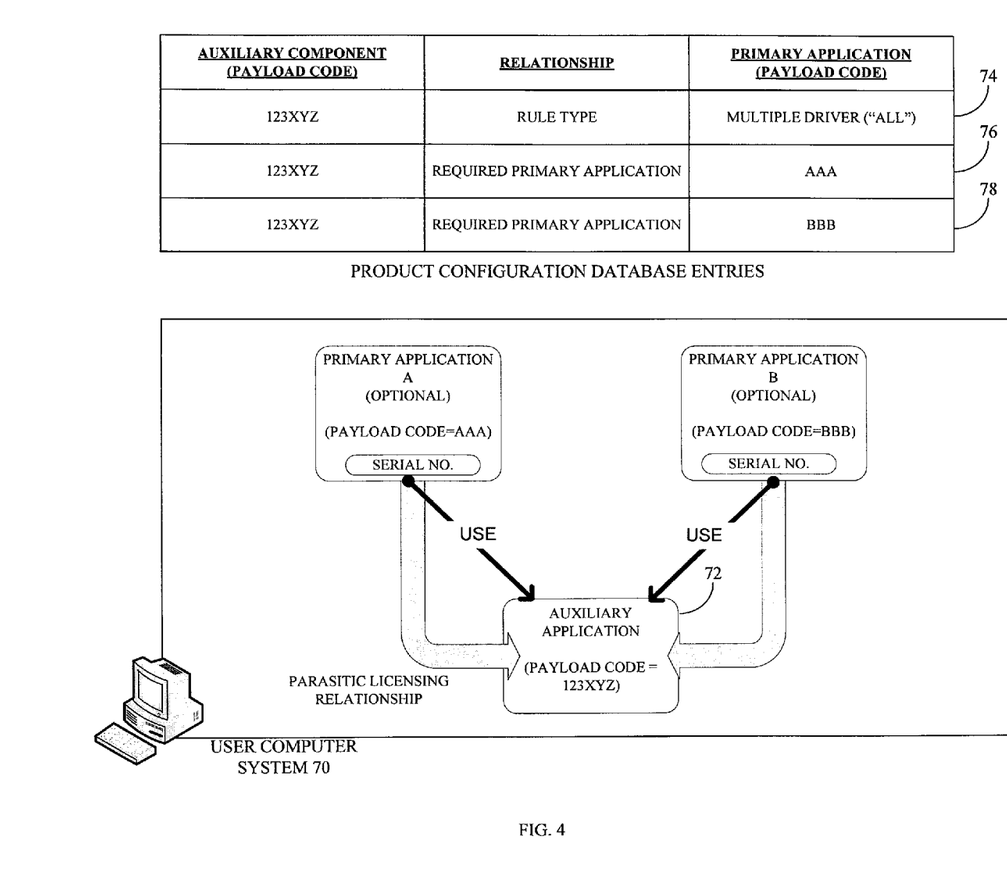
Figure 5:
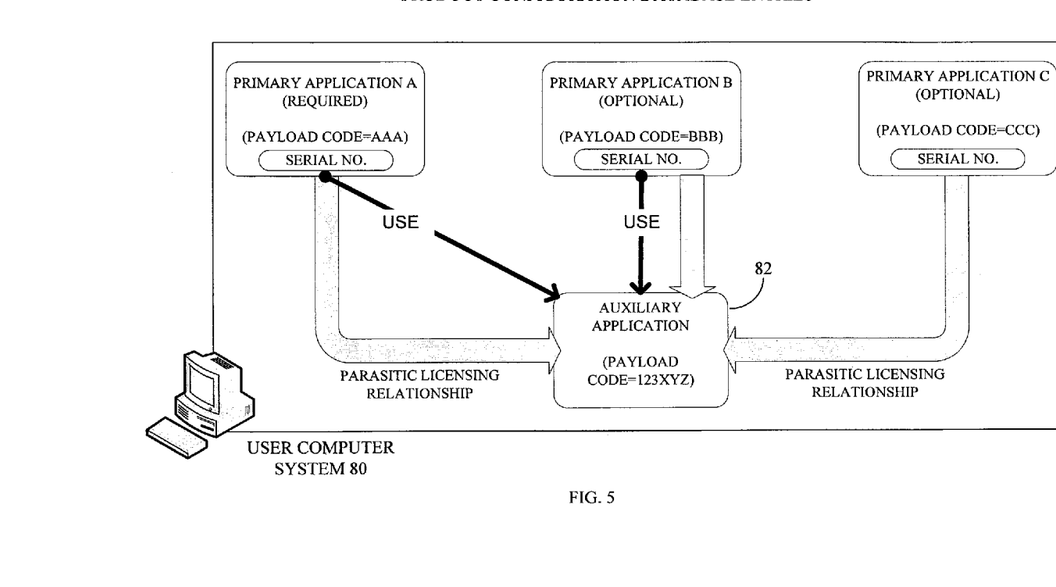

FIGS. 3 through 5 illustrate block diagrams showing various types of relationships between primary software applications and auxiliary software applications, which may form the basis of a license dependency rule that determines whether an end-user is allowed to enable and use an auxiliary software application, according to an embodiment of the invention. In FIG. 3, an example of a single host driver rule is presented. As illustrated in FIG. 3, two primary software applications are installed on a computer system 60—primary application A and primary application B. In addition, an auxiliary software application 62 is installed on the computer system 60. When the auxiliary application 62 is initially installed on the computer system 60, the license dependency rule for the auxiliary application 62 is written to the product configuration database, resulting in the database entries 64, 66 and 68 shown in FIG. 3. The first database entry 64 indicates that the license dependency rule type for the auxiliary application 62 is a single host driver rule, alternatively referred to as type, "ANY". As used herein, the term "payload code" is simply an identifier for identifying a particular software application or component. For example, in the first database entry 64, the auxiliary software application is identified by its payload code, "123XYZ". Similarly, the primary software applications are identified in the second and third database entries (e.g., with reference numbers 66 and 68) by their respective payload codes, "AAA" and "BBB". In addition, the second and third database entries 66 and 68 together indicate the set of optional primary software applications from which at least one must be installed and activated in order for the auxiliary application to be fully executed and used by an end-user. For example, according to the license dependency rule for the auxiliary application 62 as expressed by the database entries, either primary software application A or primary software application B must be installed and activated in order for the auxiliary application to be fully executed and used on the target computer system 60.

Referring again to FIG. 3, when the auxiliary software application 62 is executed for the first time, the local license manager module will verify that at least one of the two primary software applications have been installed and activated. Additionally, at subsequent run times, the local license manager may perform a license verification operation in the background, allowing the auxiliary application to execute, while verifying the license status of the primary applications designated in the license dependency rule. In this example, the broad-lined arrows indicate the parasitic licensing relationship between the primary software applications and the auxiliary application 62, as set out in the license dependency rule. In particular, either host application A or host application B is required to be installed and activated for auxiliary application 62 to be fully executable. The narrow-lined arrow with label "USE" indicates the particular primary software application (e.g., host application A) that is currently being used for the operational status of the auxiliary software application. For example, the license of primary software application A has been validated, and found to be active, thereby satisfying the license dependency rule for the auxiliary application 62. As such, the local license database would include an entry to indicate the current operational status for the auxiliary application 62. In particular, the entry would indicate that the operation of auxiliary application 62 is currently activated or validated, based upon the verification of a license for primary software application A. If at some subsequent time, the license status for host application A was to change, for example, due to the license expiring, the local license manager module would perform an additional license verification operation to ensure that primary software application B is installed and activated.

In FIG. 4, an example of a multiple host driver rule is presented. As illustrated in FIG. 4, two primary software applications are installed on a computer system 70—primary software application A and application B. In addition, an auxiliary application 72 is installed on the computer system 70. When the auxiliary application 72 is initially installed, the license dependency rule for the auxiliary application 72 is written to the product configuration database, resulting in the database entries 74, 76 and 78 shown in FIG. 4. The first database entry 74 indicates that the license dependency rule type for the auxiliary application 72 is a multiple host driver rule, alternatively referred to as type, "ALL" indicating that all primary software applications specified in the license dependency rule are required to be installed and activated. The next two database entries 76 and 78 indicate the set of required host applications that must be installed and activated in order for the auxiliary application 72 to be fully executed and used by an end-user.

Referring again to FIG. 4, when the auxiliary application 72 is executed or invoked for the first time, the local license manager module will verify that both primary software applications have been installed and activated. In this example, the narrow-lined arrow with label "USE" indicates the particular primary software applications (e.g., primary software application A and primary software application B) that are currently being depended on in order to enable the auxiliary application 72. As such, the local license database would include an entry to indicate the current operational status (e.g., enabled, based on the validation of applications A and B) for the auxiliary application 72. In particular, the database entry would indicate that the auxiliary application is currently operational because the licenses for primary applications A and B have been verified. If at some subsequent time, the license status for primary software application A or B changes, for example, due to a license expiring, the local license manager module would perform an additional license verification operation, potentially resulting in the disabling of the auxiliary application 72.

FIG. 5 illustrates an example of a selective host driver rule. In FIG. 5, the database entries 84, 86, 88 and 89 in the product configuration database indicate that the license dependency rule for auxiliary application 82 installed on computer system 80 is a selective host driver type, alternatively referred to as type, "AT LEAST ONE." In this example, the license dependency rule as indicated by the database entries requires that host application A be installed and activated, while either host application B or C is required to be installed and activated. The arrows labeled "USE" indicate that the auxiliary application 82 has been enabled, based on the verification of licenses for required primary software application A, and optional software application B.

Figure 6:
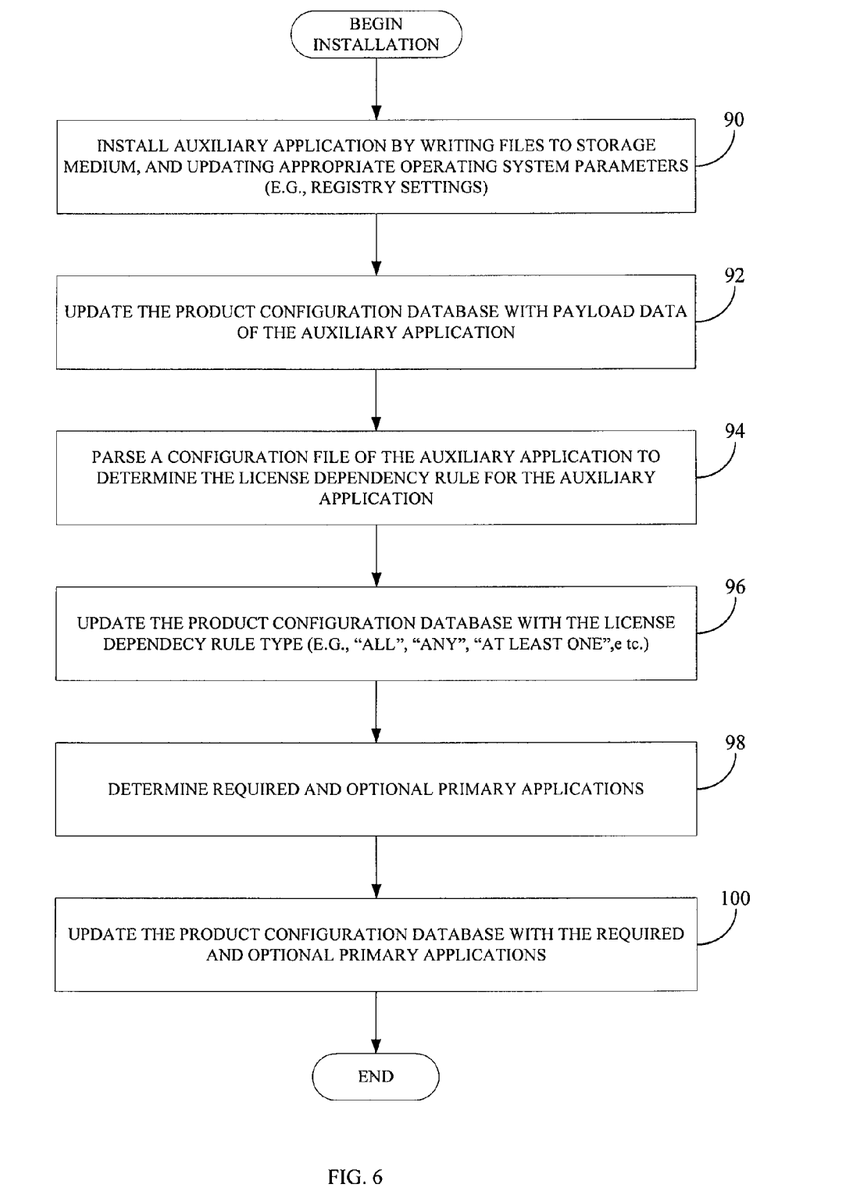
FIG. 6 illustrates a method for installing an auxiliary software application that is subject to a license dependency rule, according to an embodiment of the invention.

FIG. 6 illustrates a method for installing an auxiliary software application that is subject to a license dependency rule, according to an embodiment of the invention. The method begins when, at method operation 90, the auxiliary application is installed on a computer, for example, by writing various files to the file system of the computer, and updating one or more operating system parameters, such as registry settings, to reflect the installation of the auxiliary application. Next, at method operation 92, payload data of the auxiliary software application is written to the product configuration database. For instance, the payload data of the auxiliary application is, in some embodiments, a simple alphanumeric code that can be used to identify the particular auxiliary application, and perhaps related information, such as the version of the application.

At method operation 94, the configuration file of the auxiliary application is parsed to determine the license dependency rule for the auxiliary application. For instance, the configuration file is analyzed and various portions are read into memory to establish the specific parameters of the license dependency rule for the auxiliary application. Next, at method operation 96, the type of the license dependency rule is written to the product configuration database. For example, in some embodiments the rule type may be one of "ANY", "ALL", or "AT LEAST ONE". This type is written to the product configuration database with the payload code of the auxiliary application to establish the rule type for the auxiliary application.

Next, at method operation 98, the required and optional primary applications are determined, for example, by parsing the configuration file of the auxiliary application, or analyzing the portion of previously parsed configuration file that is currently residing in memory. In any case, once the required and optional primary applications are determined, they are written to the product configuration database at method operation 100. After the completion of method operation 100, the license dependency rule for the auxiliary application resides in the product configuration database, and upon invoking or executing the auxiliary application for the first time, the rule can be evaluated to determine whether it is satisfied, and the application can be enabled (e.g., fully executed) and used by an end-user.

Figure 7:
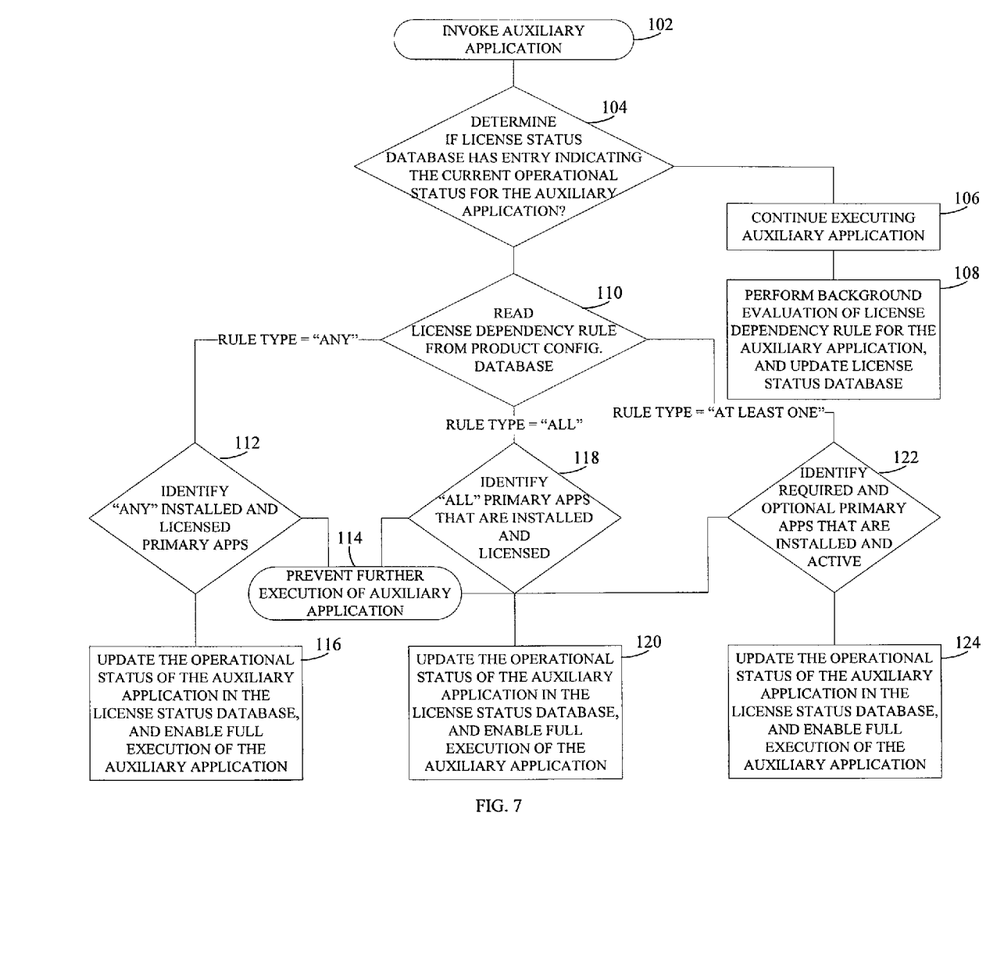
FIG. 7 illustrates a method for enabling an auxiliary software application that is subject to a license dependency rule, according to an embodiment of the invention.

FIG. 7 illustrates a method for enabling an auxiliary software application that is subject to a license dependency rule, according to an embodiment of the invention. The method operation begins at method operation 102 when the auxiliary application is invoked. At method operation 104 the auxiliary application invokes a local license manager module, which determines if a local license status database includes an entry for the auxiliary software application that indicates the current operational status for the auxiliary application. For example the local license manager module may perform a lookup operation based on the payload code of the auxiliary software application to determine if the local license status database has an entry that indicates whether or not the auxiliary software application has previously been enabled, such that the end user is allowed to fully execute and use the auxiliary application. If such an entry in the local license status database is found, indicating that the auxiliary application is enabled and operational, at method operation 106 the auxiliary application is allowed to continue executing.

In some embodiments, when the auxiliary application is determined to be enabled and operational, at method operation 108 the local license manager module performs a background evaluation of the license dependency rule for the auxiliary software application, and updates the license status database with the result of the rule evaluation. For example, if the license status for the particular primary software applications that previously satisfied the rule has not changed, then no change will be made to the local license status database. The evaluation of the license dependency rule is done in the background to minimize the impact on the execution of the auxiliary software application. Moreover, the result of the evaluation does not affect the current execution of the auxiliary application. Instead, the result is written to the license status database so that upon a subsequent invoking of the auxiliary software application, the license status database will reflect the most current operational status of the auxiliary software application. For example, if the status of a license for a primary software application has changed, the next time the auxiliary software application is invoked, it may be disabled.

If at method operation 104, the local license manager module determines that no entry exists in the local license status database for the auxiliary software application, then at method operation 110 the license dependency rule for the auxiliary software application is read from the product configuration database. Upon reading the license dependency rule, if the rule type is determined to be "ANY", indicating that any one primary software application identified in a set of primary software applications is required to be installed and activated in order for the auxiliary software application to be enabled, then at method operation 112 the license manager module will iteratively perform a series of remote license calls to a remote license server until the license manager module can determine that one of the primary software applications indicated in the rule is in fact installed and activated. If after making a license call for every primary software application identified in the license dependency rule it is determined that none of the primary software applications identified in the rule are in fact installed and activated, at method operation 114 the auxiliary software application is prevented from further execution. In such a scenario, the end-user may be notified, for example, with a pop up notification message, that none of the primary software applications are indicated as being activated. However, if any one of the primary software applications is determined to be installed and activated, thereby satisfying the rule, at method operation 116 the operational status of the auxiliary software application in the local license status database is updated, and the auxiliary software application is enabled, allowing full execution of the auxiliary application. When updating the operational status of the auxiliary software application, the local license manager module will indicate the particular primary software application which had its license status verified in order to satisfy the license dependency rule. As such, when the auxiliary application is subsequently invoked and a background evaluation of the license dependency rule is performed, the status of the primary software application identified in the local license status database can be verified first to determine if the status for that particular primary software application has been changed. Only if the status of the primary software application has changed will it be necessary to perform further remote license calls to insure the satisfaction of the license dependency rule.

If at method operation 110 the rule type is determined to be "ALL", indicating that all primary software applications identified in the license dependency rule must be installed and activated in order for the auxiliary software application to be fully executed and used by an end-user, then at operation 118 the local license manager module will make a series of license calls to the remote license server to verify the license status of all primary software applications identified in the license dependency rule for the auxiliary software application. If it is determined that all primary software applications identified in the license dependency rule are in fact installed and activated, at method operation 120 the operational status of the auxiliary application is updated in the local license status database, and the auxiliary application is enabled, making it fully executable and usable by the end-user. However if any one of the primary software applications identified in the license dependency rule is determined to not be installed, or, not activated, then at method operation 114 the auxiliary software application is prevented from further execution.

If at method operation 110 the license dependency rule is determined to be of type, "AT LEAST ONE", then at method operation 122 the installation and license status of the required and optional primary software applications is determined. If the license dependency rule is determined to be satisfied, meaning any required applications are in fact installed and activated, and the at least one optional primary application is installed and activated, then at method operation 124 the operational status of the auxiliary application is updated in a local license status database to reflect the particular primary software applications that have been validated in determining that the license dependency rule is satisfied. In addition, the auxiliary software application is allowed to fully execute. However, if the license dependency rule is determined not to be satisfied, at method operation 114 the auxiliary application is prevented from further execution.

In some embodiments, if the auxiliary software application is not indicated as being enabled and operational in the local license status database, the license dependency rule is evaluated, for example, by verifying the license status of one or more primary software applications. When validating a license dependency rule, the local license manager module may verify the status of one or more primary software applications as indicated in the local license status database, or alternatively, the local license manager module may perform one or more license calls to a remote license server to validate the license status of the one or more primary software applications as indicated by the licensing information stored on the remote license server.

Those skilled in the art will readily recognize that variations in the particular method operations illustrated in FIG. 7 can be made without departing from the overall spirit and scope of the inventive subject matter. In particular, in some instances, the order of one or more method operations may be modified without departing from the scope of the claimed invention. Moreover, the various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 8:
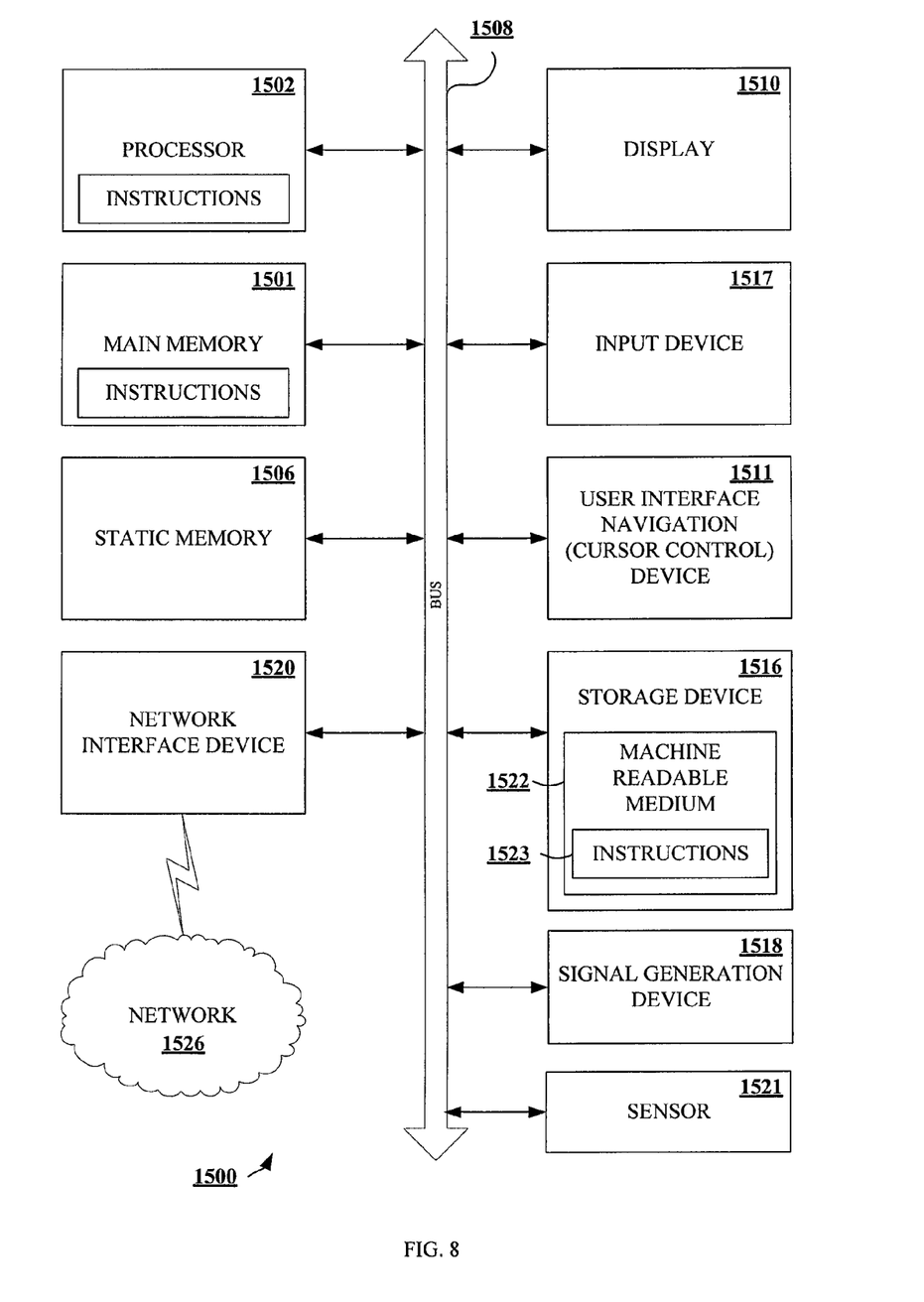
FIG. 8 is a block diagram of a machine in the form of a computer system within which a set of instructions, for caus-

FIG. 9 is a block diagram of a machine in the form of a computer system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium"

shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

What is claimed is:

1. A computer-implemented method comprising:
   responsive to an auxiliary software application that lacks independent licensing information being invoked, determining, by a processor of a computer system, an operational status of the auxiliary software application in a local database, the operational status dependent upon evaluation of a license dependency rule associated with the auxiliary software application that requires at least one primary software application having independent licensing information be activated on the computer system in order for the auxiliary software application to be fully executed by the computer system; and
   responsive to determining that the operational status indicates that the auxiliary software application is enabled, allowing full execution of the auxiliary software application.

2. The computer-implemented method of claim 1, further comprising:
   performing a background operation to evaluate the license dependency rule based on the auxiliary software application being enabled and full execution of the auxiliary software application being allowed; and
   updating the operational status of the auxiliary software application in the local database to indicate that the auxiliary application is disabled based on the background operation to evaluate the license dependency rule resulting in the license dependency rule not being satisfied.

3. The computer-implemented method of claim 1, wherein the license dependency rule indicates that any one software application selected from a set of software applications, excluding the auxiliary software application, is required to be activated on the computer system in order for the auxiliary software application to be fully executed on the computer system.

4. The computer-implemented method of claim 1, wherein the license dependency rule indicates that all software applications in a set of software applications, excluding the auxiliary software application, are required to be activated on the computer system in order for the auxiliary software application to be fully executed on the computer system.

5. The computer-implemented method of claim 1, wherein the license dependency rule indicates that a first software application and any second software application selected from a set of software applications are required to be activated in order for the auxiliary software application to be fully executed on the computer system, the first and second software applications different from the auxiliary software application.

6. A computer-implemented method comprising:
   responsive to the auxiliary software application that lacks independent licensing information being invoked, determining, by processor of a computer system, that an operational status of the auxiliary software application indicates the auxiliary software application is not enabled, the operational status dependent upon evaluation of a license dependency rule associated with the auxiliary software application that requires at least one primary software application having independent licensing information be activated on the computer system in order for the auxiliary software application to be fully executed by the computer system;
   responsive to determining that the operational status indicates the auxiliary software application is not enabled, reading the license dependency rule for the auxiliary software application from a database;
   evaluating the license dependency rule; and
   allowing the auxiliary software application to fully execute based on the evaluation of the license dependency rule indicating the license dependency rule is satisfied.

7. The computer-implemented method of claim 6, further comprising:
   when evaluating the license dependency rule, determining that a software application identified in the license dependency rule is installed on the computer system.

8. The computer-implemented method of claim 6, wherein the license dependency rule indicates that any one software application selected from a set of software applications, excluding the auxiliary software application, is required to be installed and activated on the computer system in order for the auxiliary software application to be fully executed on the computer system.

9. The computer-implemented method of claim 8, wherein evaluating the license dependency rule includes performing one or more license calls to a remote license server to verify that one software application selected from a set of software applications identified in the license dependency rule has a license status indicating that the software application is activated.

10. The computer-implemented method of claim 6, wherein the license dependency rule indicates that all software applications in a set of software applications, excluding the auxiliary software application, are required to be installed and activated on the computer system in order for the auxiliary software application to be fully executed on the computer system.

11. The computer-implemented method of claim 10, wherein evaluating the license dependency rule includes performing one or more license calls to a remote license server to verify that all software applications in a set of software applications identified in the license dependency rule have a license status indicating that the software applications are activated.

12. The computer-implemented method of claim 6, wherein the license dependency rule indicates that a first software application and any second software application selected from a set of software applications are required to be installed and activated in order for the auxiliary software application to be fully executed on the computer system, the first and second software applications different from the auxiliary software application.

13. The computer-implemented method of claim 12, wherein evaluating the license dependency rule includes performing one or more license calls to a remote license server to verify that a first software application and any second software application selected from a set of software applications as identified in the license dependency rule have a license status indicating that the software applications are activated.

14. The computer-implemented method of claim 6, wherein reading the license dependency rule for the auxiliary software application from a database at the computer system includes reading the license dependency rule from a product configuration database to which the license dependency rule was written when the auxiliary software application was installed on the computer system.

15. The computer-implemented method of claim 6, further comprising:
  when the evaluation of the license dependency rule indicates the license dependency rule is satisfied, updating a local license status database to indicate that the operational status of the auxiliary software application is enabled.

16. The computer-implemented method of claim 15, further comprising:
  updating the local license status database to identify the particular software applications whose license statuses satisfied the evaluation of the license dependency rule for the auxiliary software application.

17. A tangible computer-readable storage device having instructions stored thereon, which, when executed by a computer system, cause the computer system to perform operations comprising:
  determining that an operational status of an auxiliary software application that lacks independent licensing information indicates the auxiliary software application is not enabled, the operational status of the auxiliary software application dependent upon evaluation of a license dependency rule associated with the auxiliary software application that requires at least one primary software application having independent licensing information be installed and activated on the computer system in order for the auxiliary software application to be fully executed by the computer system;
  responsive to determining that the operational status indicates the auxiliary software application is not enabled, reading the license dependency rule for the auxiliary software application from a database at the computer system;
  evaluating the license dependency rule; and
  allowing the auxiliary software application to fully execute when the evaluation of license dependency rule indicates the license dependency rule is satisfied.

18. The tangible computer-readable storage device of claim 17, wherein the license dependency rule indicates that any one software application selected from a set of software applications, excluding the auxiliary software application, is required to be installed and activated on the computer system in order for the auxiliary software application to be fully executed on the computer system, the method further comprising:
  evaluating the license dependency rule by performing one or more license calls to a remote license server to verity that one software application selected from the set of software applications identified in the license dependency rule has a license status indicating that the software application is activated.

19. The tangible computer-readable storage device of claim 17, wherein the license dependency rule indicates that all software applications in a set of software applications, excluding the auxiliary software application, are required to be installed and activated on the computer system in order for the auxiliary software application to be fully executed on the computer system, the method further comprising:
  evaluating the license dependency rule by performing one or more license calls to a remote license server to verify that all software applications in a set of software applications identified the license dependency rule have a license status indicating that the software applications are activated.

20. The tangible computer-readable storage device of claim 17, wherein the license dependency rule indicates that a first software application and any second software application selected from a set of software applications are required to be installed and activated in order for the auxiliary software application to be fully executed on the computer system, the first and second software applications different from the auxiliary software application, the method further comprising:
  evaluating the license dependency rule by performing one or more license calls to a remote license server to verify that a first software application and any second software application selected from a set of software applications as identified in the license dependency rule have a license status indicating that the software applications are activated.

* * * * *